(12) United States Patent
Kimes et al.

(10) Patent No.: US 7,455,156 B2
(45) Date of Patent: *Nov. 25, 2008

(54) OVERRUNNING CLUTCH

(75) Inventors: John W. Kimes, Wayne, MI (US);
Bernard J. Simon, Troy, MI (US);
Michael J. McDonough, Waterford, MI (US); Xiaoyong Lu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

This patent is subject to a terminal disclaimer.

(21) Appl. No.: 11/077,531

(22) Filed: Mar. 10, 2005

(65) Prior Publication Data

US 2006/0021837 A1   Feb. 2, 2006

Related U.S. Application Data

(63) Continuation-in-part of application No. 10/899,918, filed on Jul. 28, 2004, now Pat. No. 7,100,756.

(51) Int. Cl.
*F16D 41/069* (2006.01)
(52) U.S. Cl. ........................................ 192/46
(58) Field of Classification Search .................. None
See application file for complete search history.

(56) References Cited

U.S. PATENT DOCUMENTS

| 709,900 | A | 9/1902 | Gumey et al. |
|---|---|---|---|
| 1,883,966 | A | 10/1932 | Krause |
| 2,013,765 | A | 9/1935 | Richardson |
| 2,134,405 | A | 10/1938 | Hulshizer |
| 2,323,353 | A | 7/1943 | Plog |
| 2,710,504 | A | 6/1955 | Dodge |
| 3,197,001 | A | 7/1965 | Clements |
| 3,527,327 | A | 9/1970 | McCreary |
| 3,563,354 | A | 2/1971 | Sigg |
| 3,997,041 | A | 12/1976 | Judd et al. |
| 4,363,390 | A | 12/1982 | Eisend et al. |
| 5,064,037 | A | 11/1991 | Long, Jr. |
| 5,070,978 | A | 12/1991 | Pires |

(Continued)

FOREIGN PATENT DOCUMENTS

FR          548490          1/1923

(Continued)

*Primary Examiner*—Richard M. Lorence
(74) *Attorney, Agent, or Firm*—David B. Kelley; MacMillan, Sobanski & Todd, LLC (57) ABSTRACT

A one-way clutch includes a first race having mutually spaced pockets formed with an opening at a periphery of the first race, each pocket being at least partially bounded by a wall that extends along at least a portion of a margin of the pocket and contains a drive surface. A second race includes a series of alternating notches and cam surfaces formed on a periphery of the second race facing the openings. A plurality of rockers is located in the pockets. Each rocker includes an engagement surface for driveably engaging and disengaging a notch, a reaction surface for contacting the drive surface when the engagement surface driveably engages a notch, and guide surfaces for contacting the pocket wall to guide movement of the rocker from a disengaged position toward an engaged position. Springs, located on the first race, urge the rockers toward engagement with the cam surfaces.

19 Claims, 11 Drawing Sheets

U.S. PATENT DOCUMENTS

| | | | |
|---|---|---|---|
| 5,143,189 A | 9/1992 | Meier-Burkamp |
| 5,853,073 A | 12/1998 | Costin |
| 5,947,245 A | 9/1999 | Costin et al. |
| 5,954,174 A | 9/1999 | Costin |
| 5,971,122 A | 10/1999 | Costin et al. |
| 6,062,362 A | 5/2000 | Costin et al. |
| 6,109,410 A | 8/2000 | Costin |
| 6,364,236 B1 | 4/2002 | Fohl |
| 6,373,157 B1 | 4/2002 | Sekine |
| 6,575,275 B2 | 6/2003 | Maramatsu et al. |
| 6,679,364 B2 | 1/2004 | Muramatsu et al. |
| 7,100,756 B2 * | 9/2006 | Kimes et al. | 192/46 |
| 2001/0025758 A1 | 10/2001 | Kinoshita |
| 2002/0056602 A1 | 5/2002 | Aurora |
| 2002/0112933 A1 | 8/2002 | Yamamoto et al. |
| 2002/0148697 A1 | 10/2002 | Muramatsu et al. |
| 2004/0112703 A1 | 6/2004 | Kremer |
| 2006/0021836 A1 | 2/2006 | Kimes |

FOREIGN PATENT DOCUMENTS

| | | |
|---|---|---|
| GB | 2116 | 1/1907 |

* cited by examiner

OVERRUNNING CLUTCH

CROSS REFERENCE TO RELATED APPLICATION

This application is a continuation-in-part of U.S. application Ser. No. 10/899,918, filed Jul. 28, 2004 now U.S. Pat. No. 7,100,756.

BACKGROUND OF THE NVENTION

1. Field of the Invention

The invention relates in general to a clutch that produces a drive connection between components when their relative rotation is in one direction, and overruns when relative rotation is in the opposite direction. In particular, the invention pertains to such clutches having rockers that engage or disengage at least partially due to the effect of centrifugal force acting on the rocker.

2. Description of the Prior Art

Conventional one-way clutches for producing a one-way drive connection between inner and outer races of the clutch include sprags or rollers for releasably driveably connecting the races and the components of a mechanical assembly connected to the races. Such clutches are commonly used in the powertrain or driveline of an automotive vehicle. One-way clutches perform satisfactorily in many cases, but certain applications, such as those in which large magnitudes of torque are transmitted by the clutch, or those that provide only a small space for the clutch, require one-way clutches other than conventional sprag-type or roller-type clutch to meet desire requirements.

Conventional one-way clutch assemblies have at least one sprag or roller, which driveably locks two notched or pocketed races together mutually in one rotary direction and allows the races to rotate freely in the other direction. Rocker and sprag type one-way clutch assemblies can increase the torque capacity for a given package size compared to those of a roller-type clutch, but they are generally limited in torque transmitting capacity by the magnitude of the contact or bearing stresses caused by contact of the rockers or sprags with the races.

To overcome these and other difficulties, a one-way overrunning clutch described in U.S. Pat. No. 5,070,978 includes a drive member and a driven member, which are mounted for clockwise and counterclockwise rotation about a common axis. The drive member includes a planar drive face, normal to the common axis, which connects with a source of power for rotating the planar drive face either clockwise or counterclockwise. The driven member includes a planar driven face, positioned in close proximity to and in confronting relationship with the drive face. The drive and driven members are coupled to one another through a series of pockets in one of the drive faces, and a plurality of cooperating struts carried by the other face, such that when the drive member is driven counterclockwise, it drives the driven member with it. When the drive member is driven clockwise, it does not drive the driven member, but rotates freely relative to the driven member. Column stability of the strut, which transmits the torsion load between the races, is an importance factor in the design.

U.S. Pat. No. 5,954,174 discloses a ratchet one-way clutch assembly having an inner race with notches, an outer race with pockets, and rockers located in the pockets to engage the notches. The rockers have a pivot ridge which mates with a peak or recess in the pockets in the outer race to position the rocker in the pocket. The center of mass of each rocker is located such that the rocker tends to engage or disengage a notch in the inner race. A spring is used to provide a tilting force on each rocker directed to produce engagement of the rocker with a notch.

Conventional one-way clutches develop relatively large magnitudes of hoop stress in the races when torque is transmitted through the clutch; therefore, the races of conventional one-way clutches are formed of bearing grade steel in order to withstand the operating hoop stress. Because the clutches disclosed in the '978 and '174 patents develop relative low operating hoop stresses in service, those clutch can be formed of powdered metal. Clutches formed for powdered metal potentially can be produced at relative low cost compared to the cost to form and produce a conventional clutch of high grade steel, provided extensive machining is avoided.

The clutches described in the '978 or '245 patents, however, require a significant amount of machining of the components that are formed of powdered metal. Excessive internal backlash, which can produce noise at unacceptable levels, is a potentially problem under certain operating conditions with these clutches.

A need exits, therefore, for a low cost, reliable one-way clutch that produces low operating bearing stresses and is able to be formed readily from powdered metal. The clutch should occupy little space, minimize in-service noise, and require little or no machining. Preferably, the desired clutch should include features that facilitate its assembly in a drive system.

SUMMARY OF THE INVENTION

The present invention provides a one-way clutch having an inner race, outer race, and pivoting rockers that driveably connect the races in one rotary direction and overrun in the opposite direction. The clutch is preferably formed of powdered metal. The rockers are located in one of the races, such that the clutch can employ centrifugal force to assist in disengaging the rockers from a notch plate during an overrun condition by biasing the rockers to pivot away from the notch plate. Alternately, the clutch can employ centrifugal force to assist in engaging the rockers with a notch plate by urging the rockers to pivot toward notch plate.

The shape of a pocket plate, which contains the rockers, uniquely requires no secondary machining operations for any purpose, such as to eliminate densifiers and de-densifiers in the powdered metal components. The components of the clutch that are formed from powdered metal require no machining after they are formed.

The number of notches for a given diameter is greater than other one-way clutches, thereby significantly reducing backlash. The design lends itself to easy assembly due to its configuration. A pocket plate subassembly contains the rockers and a return spring for each rocker. Before its assembly in the clutch, the pocket plate subassembly restricts the ability of each rocker to pivot in the pocket, and the force of the respective return spring prevents the rocker from exiting the pocket laterally by forcing the rocker into contact with its pocket. This arrangement permits the subassembly to be handled and transported prior to its installation in the clutch with the rockers and springs already installed in the pocket plate subassembly.

A one-way clutch according to this invention includes a first race having mutually spaced pockets formed with an opening at a periphery of the first race, each pocket being at least partially bounded by a wall that extends along at least a portion of a margin of the pocket and contains a drive surface. A second race includes a series of alternating notches and cam surfaces formed on a periphery of the second race facing the openings. A plurality of rockers is located in the pockets.

Each rocker includes an engagement surface for driveably engaging and disengaging a notch, a reaction surface for contacting the drive surface when the engagement surface driveably engages a notch, and guide surfaces for contacting the pocket wall to guide movement of the rocker from a disengaged position toward an engaged position. Springs, located on the first race, urge the rockers toward engagement with the cam surfaces.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
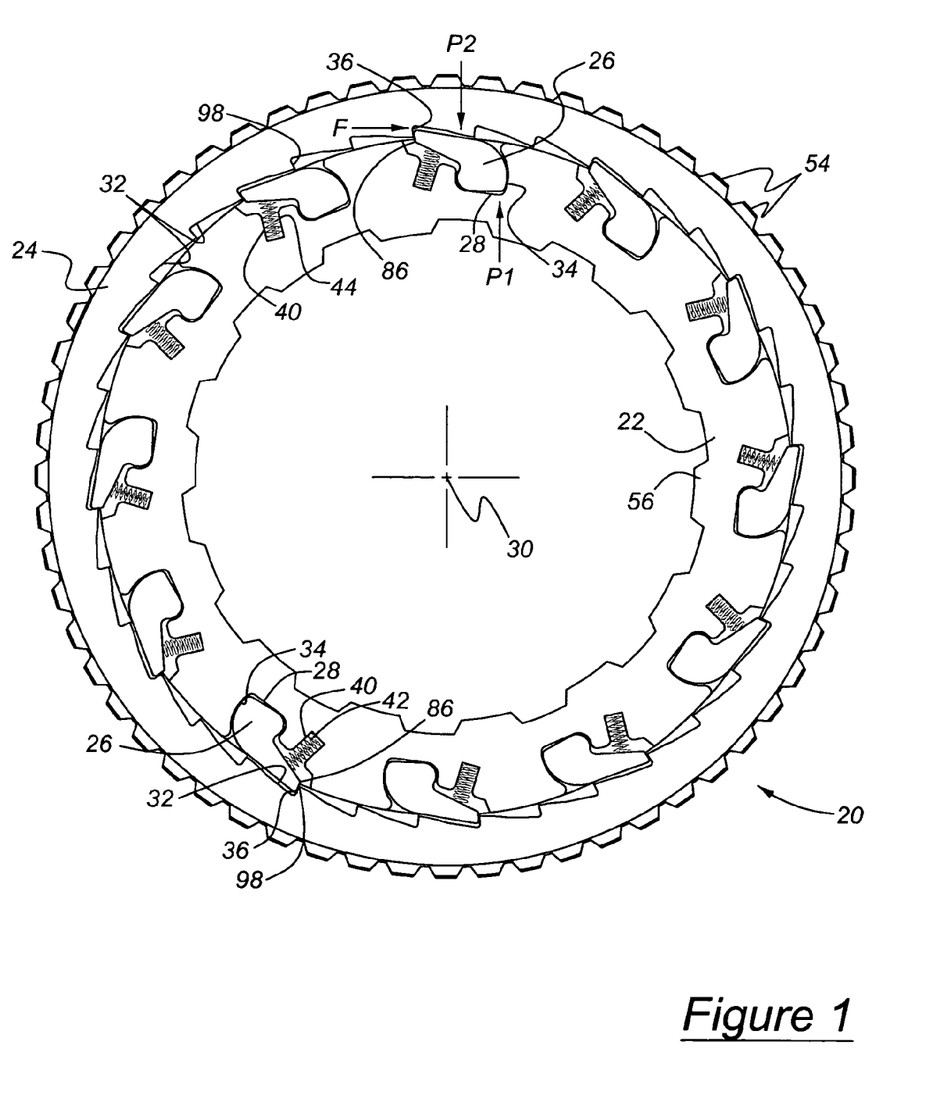
FIG. 1 is a side view of a clutch according to the present invention showing rockers located in an inner race and engaged with notches in an outer race.
Figure 2:
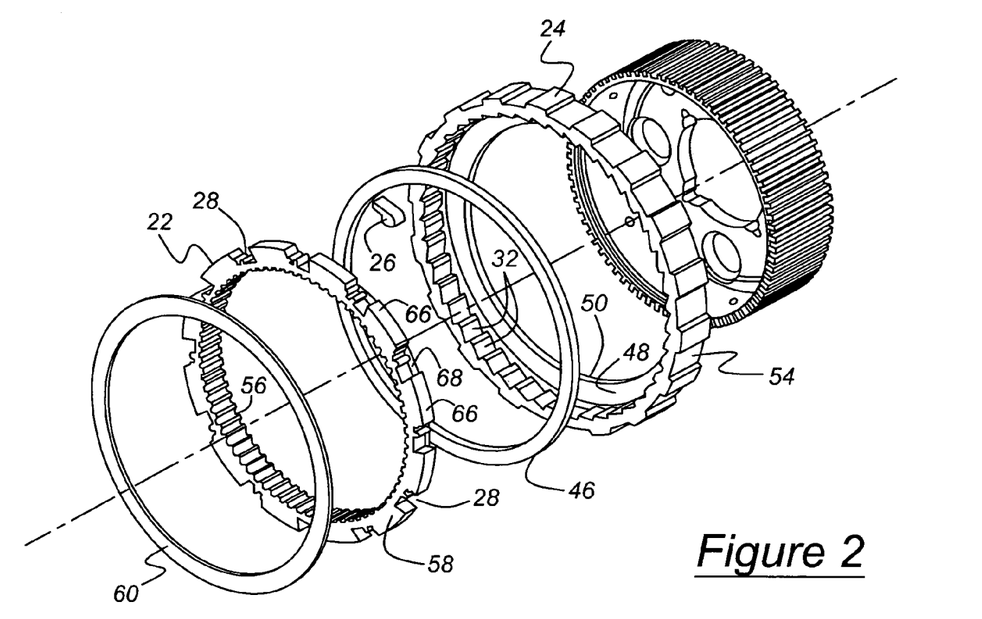
FIG. 2 is an isometric view of the clutch assembly showing the components mutually spaced axially.

Referring now to the drawings, there is illustrated in FIG. 1 a one-way clutch assembly 20 in accordance with the present invention. The clutch assembly 20 includes an inner race or rocker plate 22, an outer race or cam plate 24, and a plurality of rockers 26, each rocker being located in a pocket 28 formed in the inner race 22 and angularly spaced mutually about a central axis 30. The inner periphery of the outer race 24 is formed with a plurality of notches 32 angularly spaced mutually about axis 30. There are twelve rockers 26 and pockets 28 and thirty-six notches 32 in the clutch illustrated in FIG. 1.

When the inner race 22 rotates clockwise faster than the outer race 24, each rocker 26 pivots counterclockwise in its pocket 28 away from engagement with the notches 32 due to contact of the rockers with the inner radial surface of the outer race. This allows the inner race 22 to rotate freely clockwise about axis 30 relative to the outer race 24. When the inner race 22 attempts to rotate counterclockwise relative to the outer race 24, the inner race and outer race are engaged or driveably connected mutually by engagement of the rockers 26 with the notches 32.

When the clutch 20 is engaged, each engaged rocker 26 transmits a force F between the inner and outer races 22, 24 due to its contact with the inner surface 34 of the pocket and with the radially directed surface 36 of the engaged notch 32.

A recesses 40, located at each pocket 28, contains a spring, such as a helical coiled compression spring 42 or an accordion compression spring 44, for urging each rocker to pivot in its pocket toward engagement with the notches.

FIG. 2-5 show a clutch having a rocker plate 22 formed with angularly spaced pockets 28 and spring recesses 40, each pocket containing a rocker 26 that pivots in a respective pocket alternately to engage and to disengage the notches 32 formed on the radially inner surface of the cam plate 24. A bushing 46 of powdered metal fits within the cam plate 24.

Figure 5:
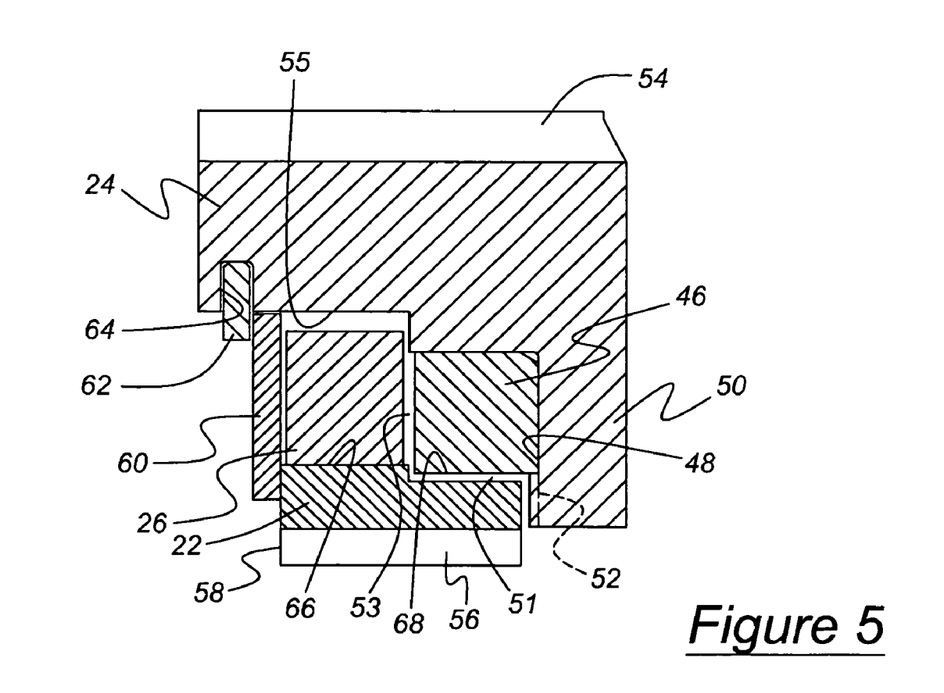
FIG. 5 is a side view, partial cross section through a diametrical plane showing the components assembled.

As seen best in FIG. 5, when clutch 20 is assembled, an axial surface of bushing 46 contacts an inner axial surface 48 of a flange 50. Surface 48 is formed with radially directed grooves 52, which carry fluid lubricant, preferably transmission oil, radially outward a radial inner surface of the bushing 46. Oil enters the radial grooves 52 through holes 49 formed through a drive system component 72, which is connected to the clutch 20. The oil travels axially leftward across the inner radial surface 51 on the bushing 46, to a radial space 53, which directs the oil radially outward to surface 55, across the width of the rocker plate 22 and across the surface of the rockers 26. Bushing 46 pilots the inner and outer races 22, 24 and eliminates need to machine along the notches or cams 32 of the outer race or the radial outer surface area 66 of the rocker plate 22. Lubricating oil is precisely directed radially along grooves 52 to the bushing 46, then axially between surfaces 68 on the rocker plate 22 and the inside diameter 51 of the bushing to the rockers 26. The lubricant flows along this path due to a centrifugal pressure head developed as the clutch rotates about axis 30.

The radial outer surface of the cam plate 24 is formed with splines 54, by which the cam plate is driveably connected to a drive system. Similarly, the radially inner surface of the rocker plate 24 is formed with splines 56, by which the rocker plate is driveably connect to a component of the drive system.

An axial surface 58 of rocker plate 22 contacts a retainer ring 60, which closes the axial end of each pocket 28 and is retained in position by a snap ring 62, which engages a recess 64 formed on the cam plate 24.

Figure 3:
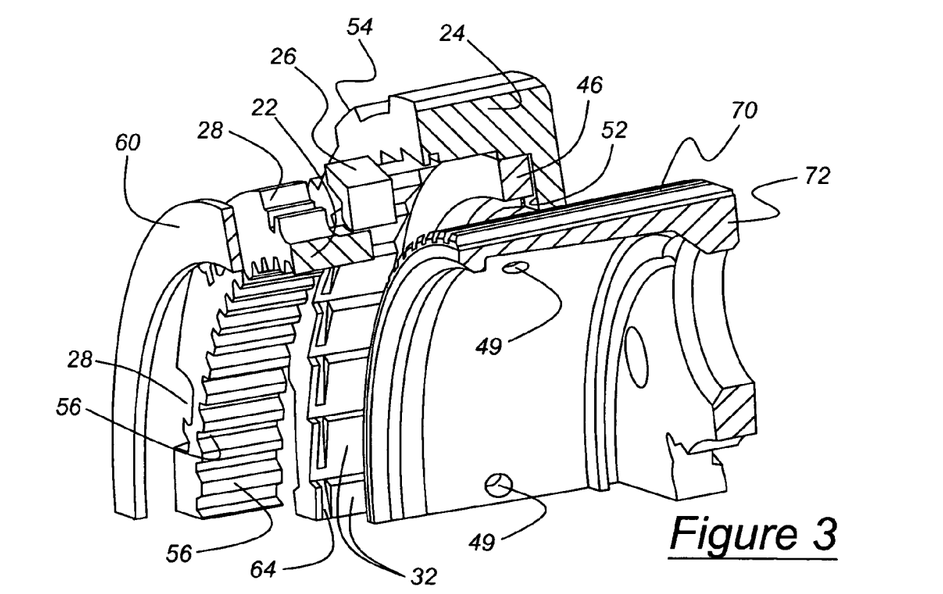
FIG. 3 is a isometric view of the clutch assembly of FIG. 2 partially in cross section taken at a diametric plane showing the components in spaced relationship.
Figure 4:
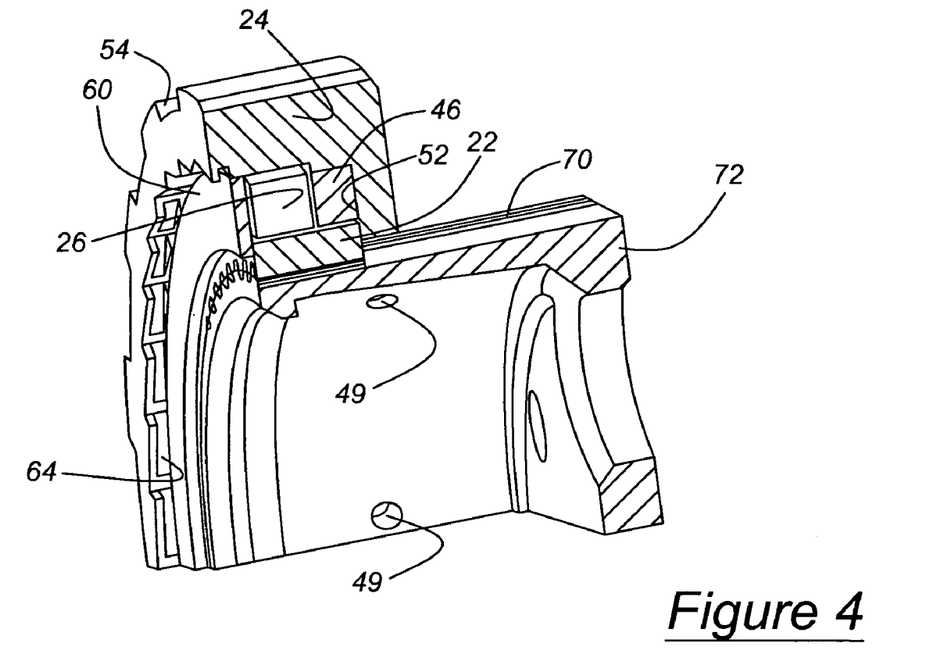
FIG. 4 is an isometric view of the clutch assembly of FIG. 2 partially in cross section through a diametrical plane showing the components assembled.

FIGS. 3 and 4 show the components of the clutch 20 located immediately adjacent their assembled positions and in the assembled positions, respectively. The clutch 20 is assembled with the cam plate 24 driveably connected by splines 70 to a drum 72 of a vehicle drive system.

Figure 6:
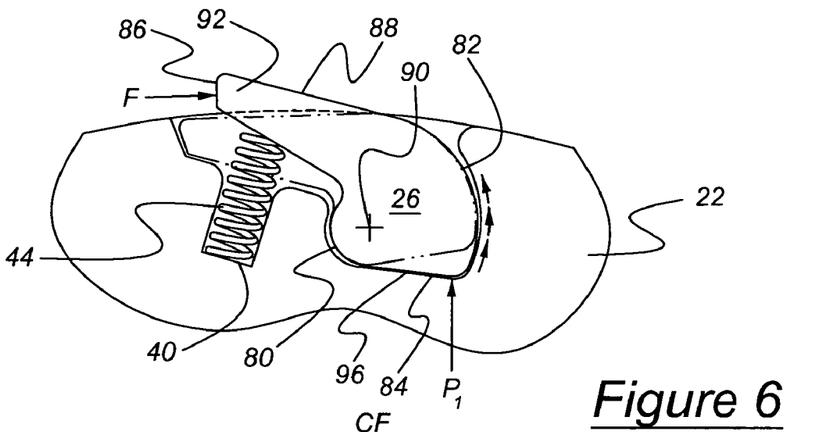
FIG. 6 is side view of a portion of an inner race showing a rocker, pocket, and return spring.

Referring now to FIG. 6, a preferred embodiment of a rocker 26 may include several surfaces 80, 82, 84, 86, 88, and a defined pivot center 90. Surfaces 80 and 82 are both circular cylindrical surfaces whose arcs are concentric with the pivot center 90. Surfaces 80, 82 guide rotation or pivoting of the rocker 26 and limit that pivoting to one degree of freedom.

Surface 80 is a guiding surface. When force F is applied while the clutch is driving and the rockers 26 are engaged with the notches 32, preferably no reaction force is developed on surface 80. Surface 82 is a surface on which the reaction to force F is developed when clutch 20 is transmitting torque between the outer race and inner race 22 through the rocker 26. Because the center of surface 82 is located at the pivot center 90, the reaction to force F is distributed along surface 82 is centered at pivot center 90, and produces no torque tending to pivot the rocker 26 about the pivot center.

Surface 84 limits clockwise pivoting of the rocker 26 and assists assembly of the race 22 or 24 that contains the pockets 28, rockers 26 and springs 42, 44. That race is prepared for installation by inserting a rocker 26 in each pocket and placing a spring 42, 44 in each recess 40. The force applied by the spring on its respective rocker rotates the rocker to the position shown in FIG. 6 where surface 84 contacts the base 96 of the pocket 28. The spring force and its reaction force on the base 96 retains the rocker in the pocket without the presence of the other race or another assembly aid. The race containing the rockers can be transported readily with the rockers in this retained condition preparatory to installing the race subassembly in the clutch assembly 20.

By limiting pivotal rotation of the rocker 26 about pivot center 90, a counter-rotation reaction force on the strut is generated at surface 84 when the clutch is driving or engaged. When clutch 20 is driving, force F, applied to rocker surface 86, produces a clockwise torque on the rocker about the pivot center 90. Torque about center 90 produced by force F is reacted by a force P1 where rocker surface 84 contacts pocket surface 96. Without surface 84, the full reaction torque would be reacted elsewhere. For example, if the full torsion reaction to force F were applied to rocker surface 88, a large hoop stress would be generated on the race contacted by surface 88 tending to shear the wall of that race due to a high angle of incidence of the reaction force. If the torsion reaction to force F were applied to surface 82, it would be applied at the extremity of the inner race at its weakest point. Preferably, the torsion reaction to force F is located normal to the pocket base 96 at rocker surface 84, and on surface 82 where friction is developed due to contact with the pocket.

Surface 86 is the surface on which force F is applied when the clutch 20 is driving and the rockers 26 are engaged with the radial surfaces 36 of the notches 32. Surface 86 performs this function by creating a mechanical interference when the rocker is pivoted to the engaged position.

Surface 88, located at the contour of the strut portion 92 of the rocker 26, contacts the crest 98 of the radial surfaces 36 of the notches 32 to ensure no interference when the clutch 20 is overrunning and the rockers 26 are disengaged from the notches 32. Surface 88 is curved to facilitate formation of a film of lubricant while the clutch is overrunning. Surface 88 is curved also to minimize impact with the crests 98 while the clutch overruns by providing transitional positions that minimize the rate of rotation of the rocker into the pocket relative to the rate of rotation of the outer race. This minimizes angular acceleration on the rocker as the clutch overruns.

The center of mass 100 of the rocker 26 can be located in relation to the pivot center 90 such that centrifugal force tends either to engage or to disengage the rocker, whether the rocker is located on the outer race or the inner race.

Figure 7:
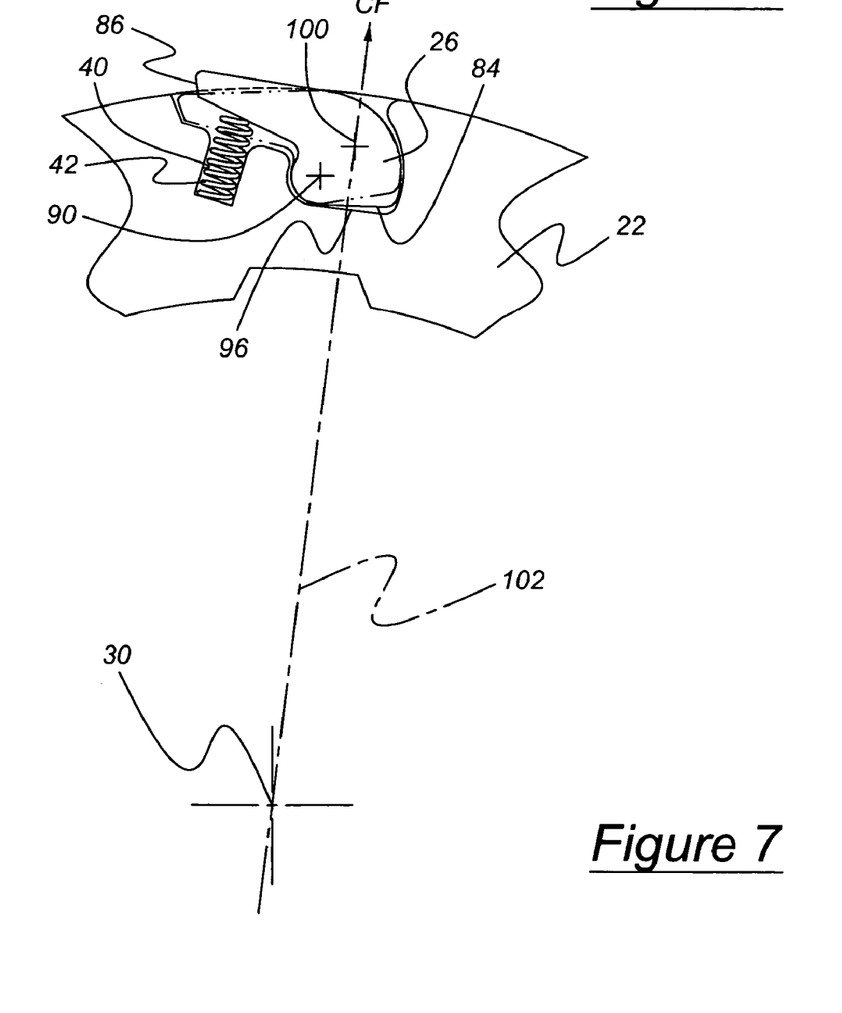
FIG. 7 is side view of a portion of an inner race showing a rocker, pocket, return spring, and a CF vector.

When viewed as in FIG. 7, the center of mass 100 is located rightward from a line connecting the axis 30 and the pivot center 90, and the rocker is carried in a pocket located on an inner race 22. As the clutch assembly 20 rotates about axis 30, centrifugal force on the rocker is directed radially outward along a line 102 that passes through axis 30 and the center of mass 100, causing the rocker 26 to pivot counterclockwise about the pivot center 90. This counterclockwise pivoting of the rocker opposes the force of the spring 42, 44 and tends to pivot rocker surface 86 away from contact with pocket surface 36 on the inner race 24. This counterclockwise pivoting of the rocker tends to move the rocker to a disengaged position, and allows the inner race 22 to overrun and the clutch 20 to disengage. The magnitude of the moment about pivot center 100 tending to compress spring 42 and to pivot the rocker 26 to the disengaged position varies with the speed of rotation of the inner race and the distance of the center of mass 100 from the pivot center 90.

Alternatively the center of mass may be located leftward from a line connecting the axis 30 and the pivot center 90, when the rocker is carried in a pocket located on an inner race 22. In that case, as the clutch assembly 20 rotates about axis 30, centrifugal force on the rocker causes the rocker 26 to pivot clockwise about the pivot center 90. This clockwise pivoting of the rocker adds to the effect of the force of spring 42, tends to move surface 86 of the rocker toward contact with radial surface 36 on the outer race 24, i.e., to pivot the rocker 26 to an engaged position, and causes the clutch to engage.

Figure 8:
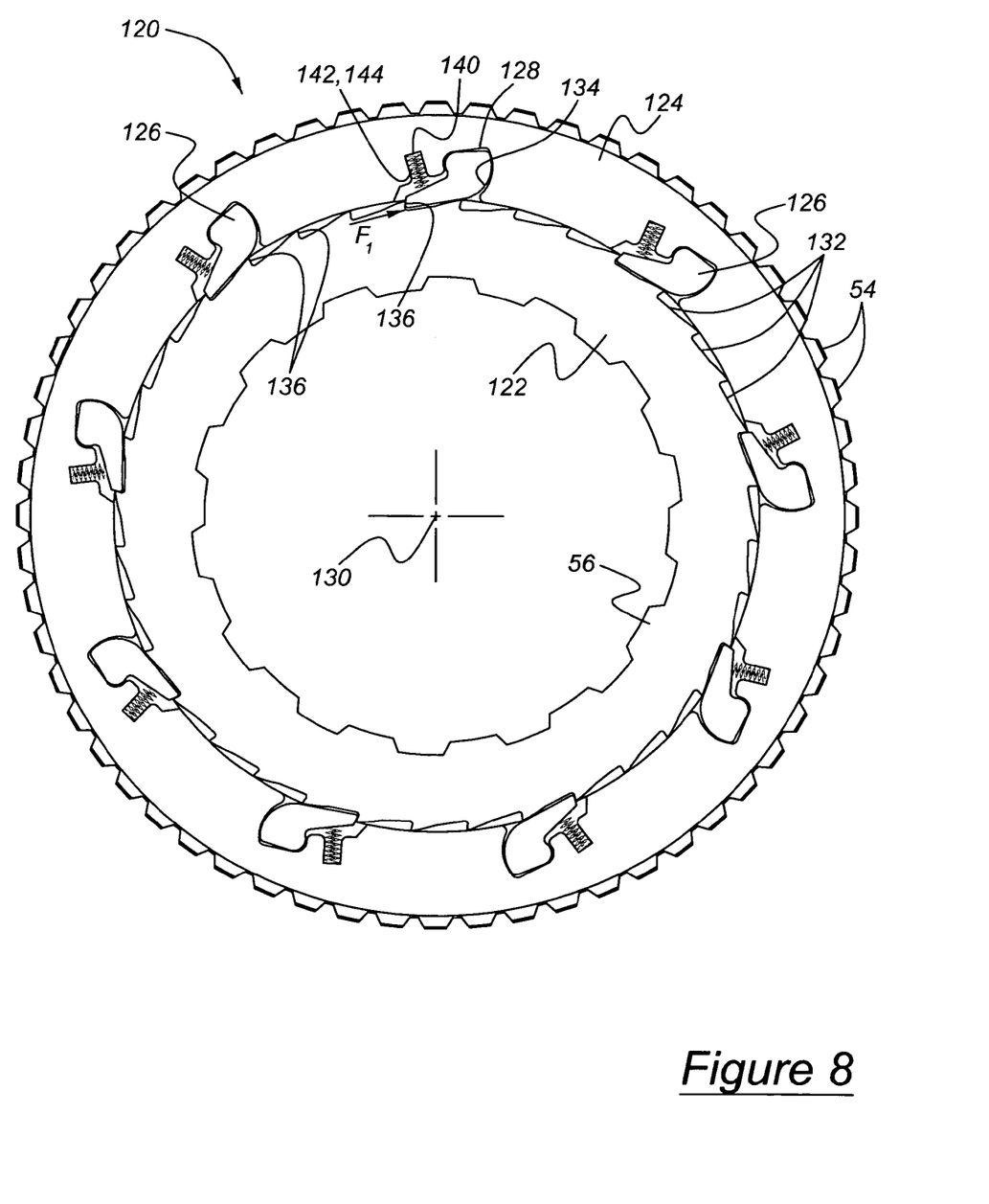
FIG. 8 is a side view of a clutch showing rockers located in an outer race and engaged with notches in an inner race.

FIG. 8 illustrates an embodiment of a clutch assembly 120, in accordance with the present invention. The clutch assembly 120 includes an inner race or rocker plate 122, an outer race or cam plate 124, and a plurality of rockers 126, each rocker being located in a pocket 128 formed in the outer race 124 and angularly spaced mutually about a central axis 130. The outer periphery of the inner race 122 is formed with a plurality of cams or notches 132, angularly spaced mutually about axis 30. There are nine rockers 126 and pockets 128 and thirty-six notches 132 in the clutch illustrated in FIG. 1.

When the outer race 124 rotates clockwise faster than the inner race 122, each rocker 126 pivots clockwise in its pocket 128 away from engagement with the notches 132 due to contact of the rockers with the outer radial surface of the inner race. This allows the outer race 124 freely to rotate clockwise about axis 130 relative to the inner race 122. When the outer race 124 attempts to rotate counterclockwise relative to the inner race 122, the inner race and outer race are engaged or driveably connected mutually by engagement of the rockers 126 with the notches 132.

When the clutch 120 is engaged, one or more engaged rockers 126 transmit a force between the inner race 122 and outer race 124 due to the rocker's contact with the inner surface 134 of the pocket 126 and with the radially directed surface 136 of the engaged notch 132.

A recesses 140, located at each pocket 28, contains a spring, such as a helical coiled compression spring 142 or an accordion compression spring 144, for urging each rocker to pivot in its pocket toward engagement with the notches.

Figure 9:
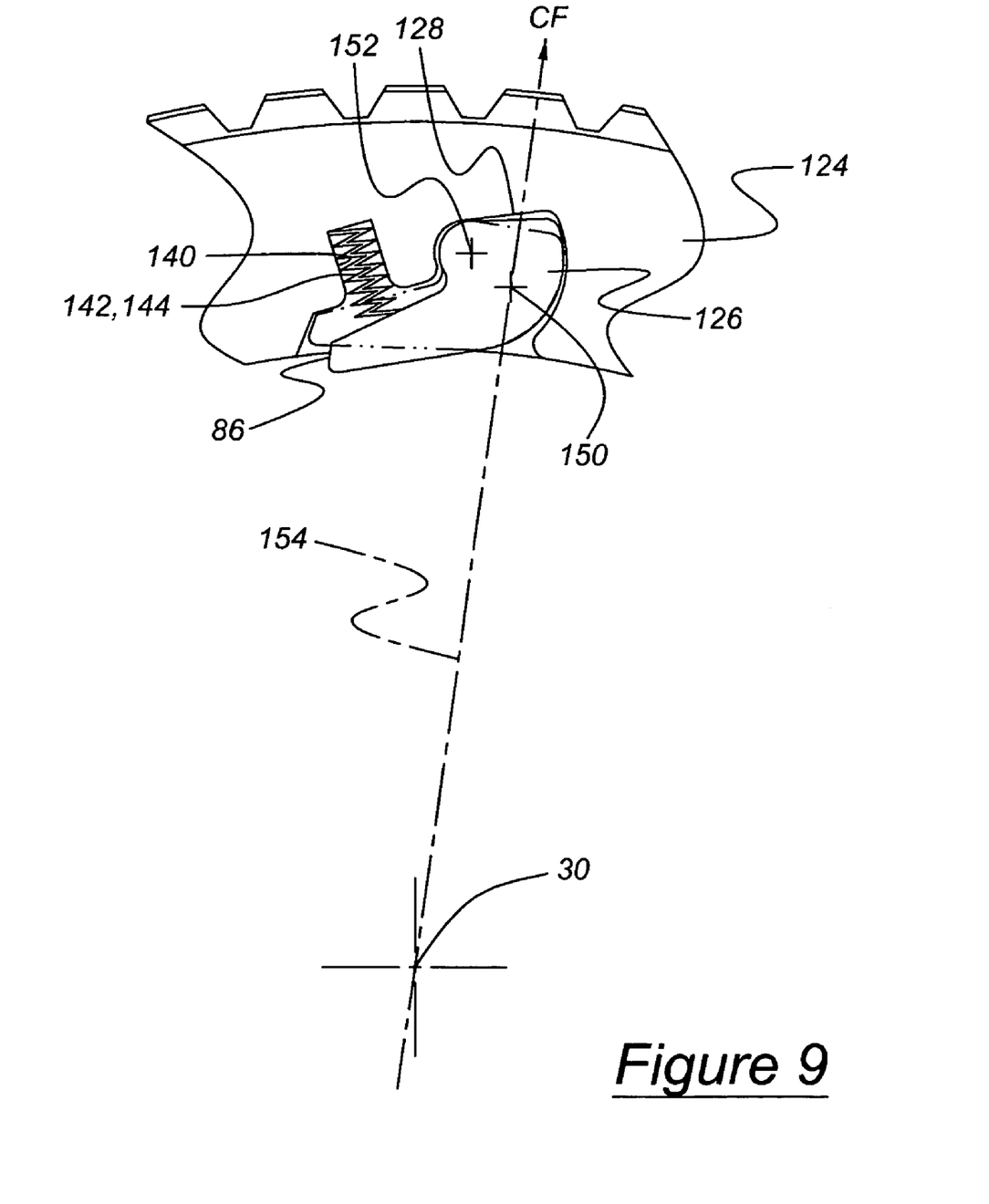
FIG. 9 is side view of a portion of an outer race showing a rocker, pocket, return spring, and a CF vector.
Figure 10:
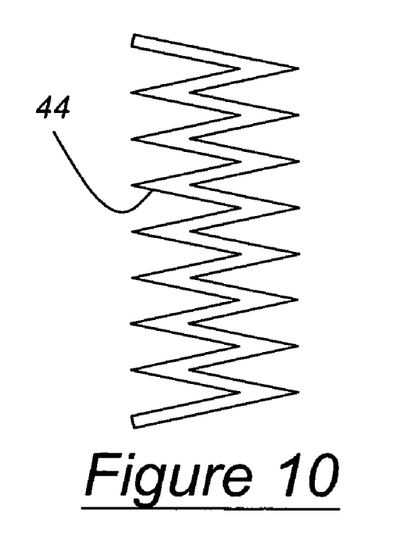
FIG. 10 is side view of an accordion return spring.
Figure 11:
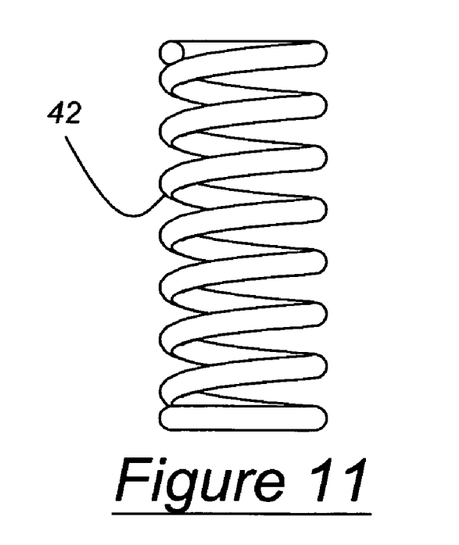
FIG. 11 is side view of a helical return spring.

When the clutch assembly 120 is viewed as in FIG. 9, the center of mass 150 of each rocker 126 is located rightward from a line connecting the axis 130 and the pivot center 152. As the outer race 124 rotates about axis 130, centrifugal force on the rocker is directed radially outward along a line 154 that passes through axis 130 and the center of mass 150, causing the rocker 126 to pivot counterclockwise about the pivot center 152. This counterclockwise pivoting of the rocker cooperates with the force of the spring 42, 44, tends to pivot the rocker to an engaged position with surface 136, and engages the clutch.

Alternatively, in the clutch assembly 120, the center of mass 150 of each rocker 126 may be located leftward from a line connecting the axis 130 and the pivot center 152. In that case, as the outer race 124 rotates about axis 30, centrifugal force on the rocker causes the rocker 126 to pivot clockwise about the pivot center 152. This clockwise pivoting of the rockers opposes the effect of the spring force and tends to pivot rotate surface 86 of the rocker away from contact with radial surface 136 on the inner race 122. This action tends to move the rocker to a disengaged position, and allows the clutch to overrun and to disengage.

Figure 12:
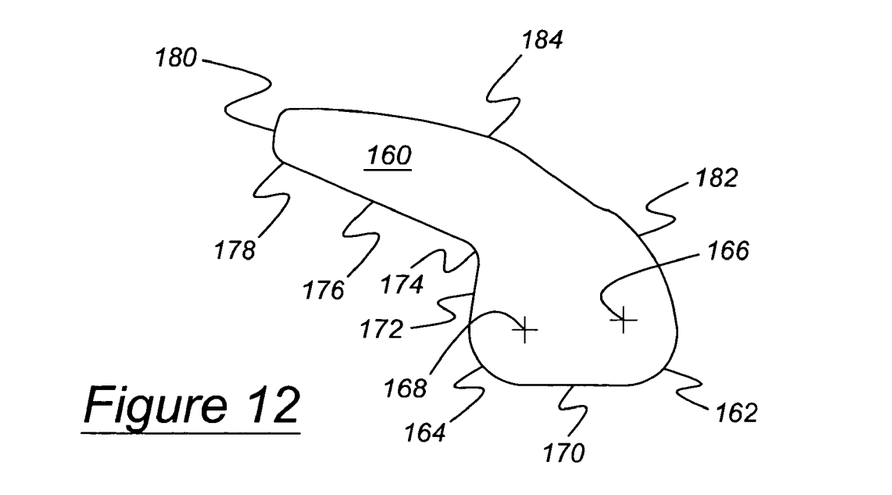
FIG. 12 illustrates a rocker 160 having a preferred outer surface.

FIG. 12 illustrates a rocker 160 having a preferred configuration. Surfaces 162 and 164, both convex circular cylindrical surfaces extending across the thickness of the rocker and centered at 166 and 168, respectively, are mutually connected by a surface 170, which is slightly concave. A planar lateral surface 172, tangent to surface 164, extends to an internal fillet 174, from which another planar surface 176, tangent to fillet 174, extends to an external fillet 178, which is located adjacent an engagement surface 180. A convex circular cylindrical lateral surface 182 blends into surface 162. A ratchet surface 184, another convex circular cylindrical surface, which extends from engagement surface 180 toward surface 182, is the rocker surface that contacts the cam surfaces 194 when the clutch overruns.

FIGS. 13-18 show progressive movement of the rocker 160 as the outer race 24 rotates clockwise relative to the inner race 22. When the clutch is disengaged or overrunning, the ratchet surface 184 of the rocker slides across the cam surfaces 194 on the outer race 24. When the clutch is engaged, the engagement surface 180 engages one of the notches 32 on the outer race 24.

Figure 13:
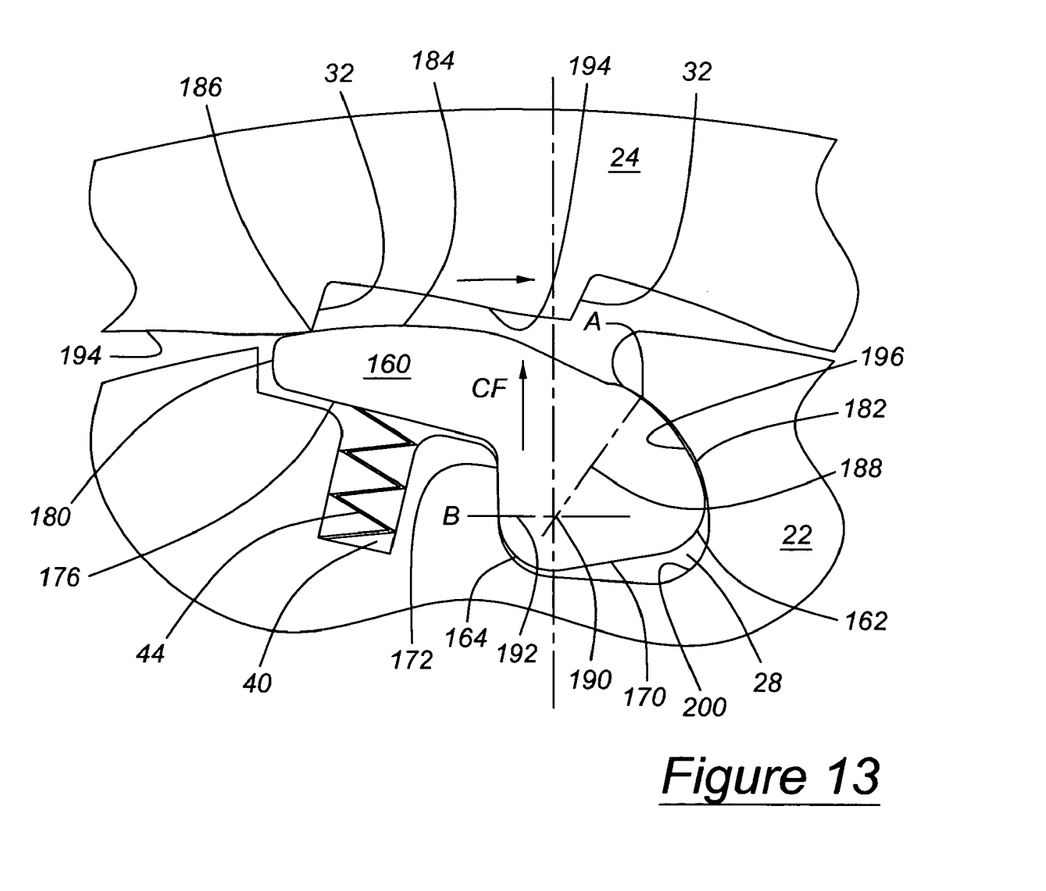
FIGS. 13-18 is a series of figures showing movement of the rocker from an overrunning position to an engaged position.

FIG. 13 shows the rocker 160 nearly fully retracted within a pocket 28 on the inner race 22, as ratchet surface 184 contacts the outer race 24 at the crest 186 of a cam surface 194. With the clutch so positioned, the force of spring 44, applied to surface 176, forces rocker ratchet surface 184 into contact with the cam 194, first lateral surface 182 contacts the side wall of pocket 28 at A, and the second lateral surface 172 contacts the side wall of pocket 28 at B. The centrifugal force CF of the rocker, directed radially from axis 30 through the center of mass of the rocker, in this example, urges the rocker clockwise causing clutch engagement. A line 188, normal to the tangent at point A on the rocker, intersects at 190 a line 192, normal to the tangent at point B on the rocker. This intersection 190 is the instantaneous center about which the rocker pivots clockwise in the pocket.

Figure 14:
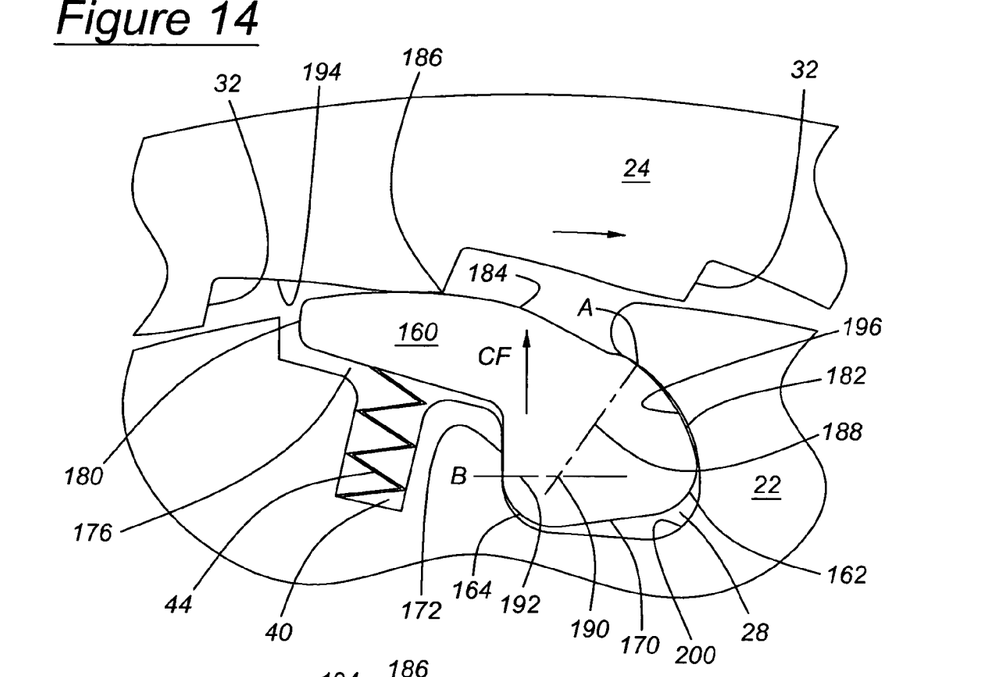

FIG. 14 shows the rocker 160 having pivoted from the position shown in FIG. 11 due to the outer race 24 having rotated about its axis 30 two degrees clockwise from the position of FIG. 13. Ratchet surface 184 maintains contact with cam surface 194, whose crest 186 has moved away from surface 194. The first and second lateral surfaces 182, 172 of the rocker 160 also contact the side walls of pocket 28 at points A and B, which have moved from their positions in FIG. 13. The instantaneous pivot center is also relocated to 190.

Figure 15:
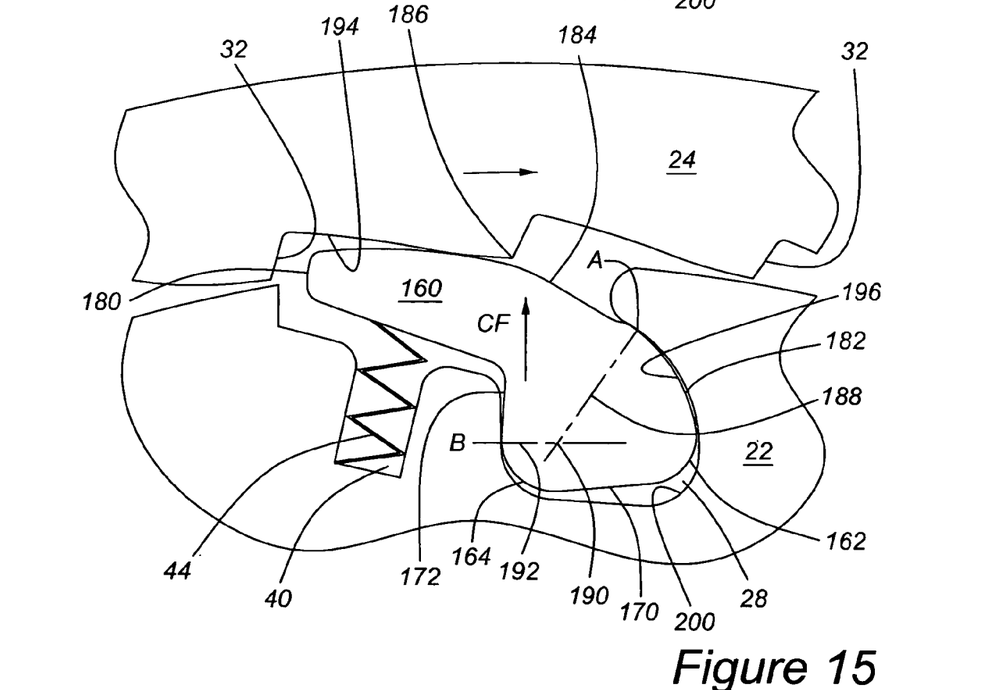

FIG. 15 shows the outer race 24 having rotated five degrees clockwise about its axis 30 from the position shown in FIG. 13. Rocker ratchet surface 184 maintains contact with cam surface 194, and the first and second lateral surfaces 182, 172 of the rocker 160 also contact the side walls of pocket 28 at point A on surface 182 and point B on surface 172, which have moved from the positions of FIGS. 13 and 14. The instantaneous pivot center is relocated to 190.

Figure 16:
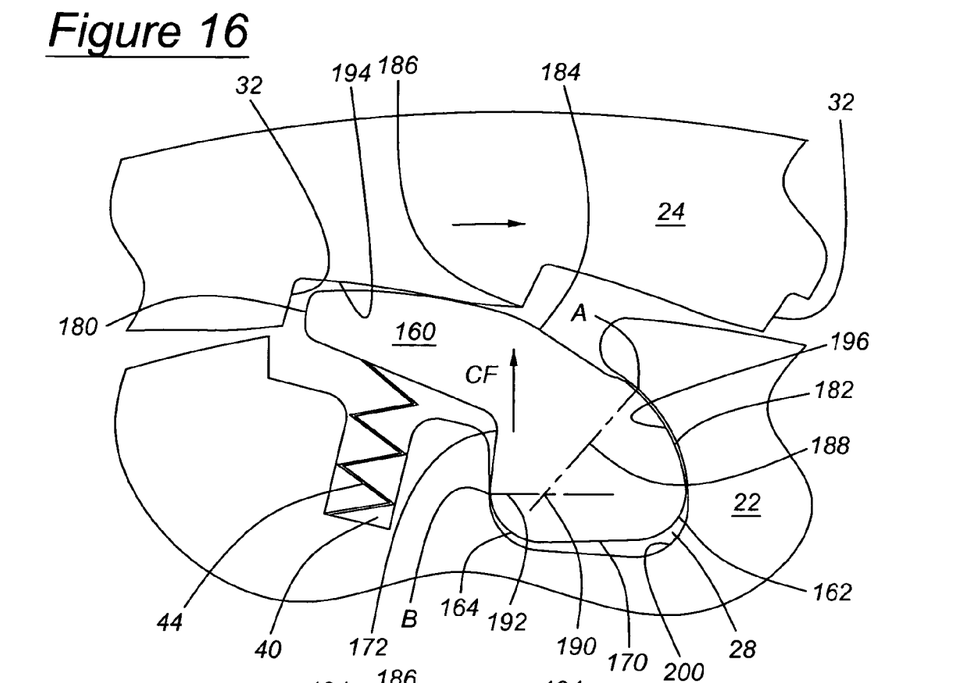

FIG. 16 shows the outer race 24 having rotated eight degrees clockwise about axis 30 from the position shown in FIG. 13. Ratchet surface 184 maintains contact with the cam 194, and first and second lateral surfaces 182, 172 of rocker 160 contact the side walls of the pocket 28 at point A on surface 182, and at point B, which has moved to cylindrical surface 164. The instantaneous pivot center is relocated at 190.

Figure 17:
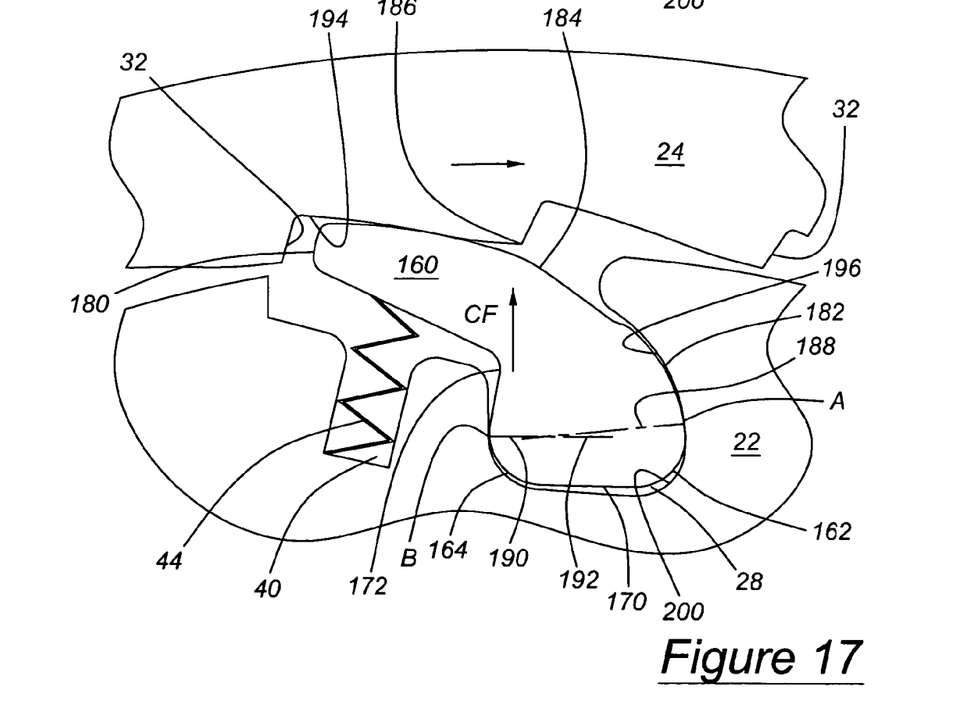

FIG. 17 shows the outer race 24 having rotated eleven degrees clockwise about axis 30 from the position shown in FIG. 13. Ratchet surface 184 maintains contact with the cam 194, and the first and second lateral surfaces 182, 172 of rocker 160 contact the side walls of the pocket 28 at point A, which is now located on or near cylindrical surface reaction 162, and at point B, which is on convex cylindrical surface 164. The instantaneous pivot center is relocated to 190.

Figure 18:
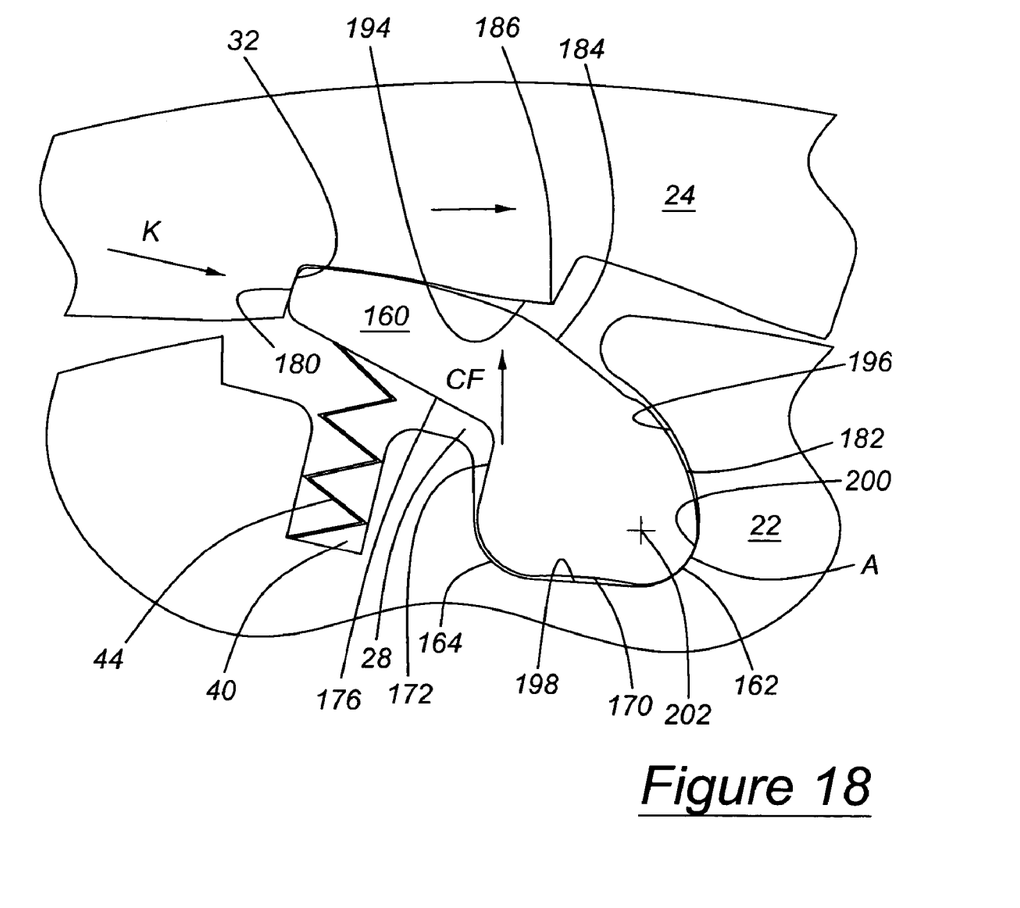

FIG. 18 shows the clutch engaged due the outer race 24 having rotated fourteen degrees clockwise about axis 30 from the position shown in FIG. 13. Due to this rotation, cam surface 194 has moved across ratchet surface 184 bringing engagement surface 180 of rocker 160 into engagement with the notch 32. Thereafter, the inner and outer races rotate clockwise as a unit. Ratchet surface 184 maintains contact with the cam 194, and the reaction surface 162 of the rocker 160 contacts the drive surface of the pocket 28 at point A, which is now located near the mid-point of reaction surface 162 and drive surface 200. But the rocker 160 no longer contacts the side wall of the pocket 28 at point B. A force C is developed at point A in reaction to the engagement force K applied by the outer race 24 to the rocker contact surface 180.

Preferably, the radius of reaction surface 162 is equal, or substantially equal to the radius of the drive surface 200, so that those surfaces are engaged when the clutch is engaged, the position shown in FIG. 18. When the clutch is the engaged, the first lateral surface 182 is spaced from the adjacent pocket surface 196, rocker surface 170 is spaced from the adjacent pocket surface 198 due to the slightly concavity of surface 170, convex rocker surface 164 is spaced from the adjacent concave corner surface of the pocket, and the second lateral rocker surface 172 is spaced from the adjacent side wall of the pocket. The only contact between the rocker 160 and the pocket when the clutch is engaged is at point A, where the concave drive surface 200 engages the convex drive surface 162. When the clutch is engaged, engagement surface 180 contacts a notch 32, and ratchet surface 184 contacts cam surface 194, thereby ensuring that rocker 160 engages the pocket drive surface 200 at point A, where the principal reaction to force K is applied to the rocker.

While the clutch is engaged, the inner race 22 and outer race 24 rotate clockwise as a unit until the clutch again overruns due to the inner race rotating clockwise faster than the outer race, or the outer race rotating counterclockwise relative to the inner race. When the clutch overruns, surfaces 32 and 180 separate, and the rocker ratchet surface 184 moves counterclockwise relative to cam surface 194, which causes the rocker to pivot counterclockwise in its pocket 28 toward the position of FIG. 13.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A one-way clutch comprising:
   a first race including pockets, each pocket including a concave drive surface and first guide surfaces located on opposite sides of the drive surface;
   a second race including notches and cam surfaces; and
   rockers, each rocker located in one of the pockets and including an engagement surface, a convex reaction surface contacting the drive surface only when the engagement surface engages one of the notches, and second guide surfaces which contact the first guide surfaces when the engagement surface disengages the notch.

2. The clutch of claim 1, wherein each rocker further comprises a ratchet surface that engages the cam surfaces while the clutch overruns.

3. The clutch of claim 1, wherein each rocker includes a center of mass positioned such that, upon rotation of the first race, each rocker is biased by centrifugal force toward engagement with the cam surfaces.

4. The clutch of claim 1, wherein each rocker includes a center of mass positioned such that, upon rotation of the first race, each rocker is biased by centrifugal force away from engagement with the cam surfaces.

5. The clutch of claim 1 further comprising springs located on the first race, each spring urging one of the rockers toward engagement with the cam surfaces.

6. The clutch of claim 5 wherein each spring is one of an accordion compression spring and a helical, coiled compression spring.

7. The clutch of claim 1 wherein:

the first race further includes recesses, each recess directed toward one of the rockers and containing a spring.

8. A one-way clutch comprising:

an inner race including pockets, each pocket including a concave drive surface and first guide surfaces located on opposite sides of the drive surface;

an outer race encircling the inner race and including notches and cam surfaces; and rockers, each rocker located in one of the pockets and including an engagement surface, a convex reaction surface contacting the drive surface only when the engagement surface engages one of the notches, and second guide surfaces which contact the first guide surfaces when the engagement surface disengages the notch.

9. The clutch of claim 8, wherein each rocker further comprises a ratchet surface that engages the cam surfaces while the clutch overruns.

10. The clutch of claim 8, wherein each rocker has a center of mass positioned such that, upon rotation of the inner race, the rockers are biased by centrifugal force toward engagement with the cam surfaces.

11. The clutch of claim 8, wherein each rocker has a center of mass positioned such that, upon rotation of the inner race, the rockers are biased by centrifugal force away from engagement with the cam surfaces.

12. The clutch of claim 8 wherein:

the inner race further includes recesses, each recess directed toward one of the rockers and containing a spring.

13. The clutch of claim 8 further comprising springs located on the first race, each spring urging one of the rockers toward engagement with the cam surfaces.

14. A one-way clutch comprising:

a first race including pockets, each pocket including a concave drive surface, a first concave guide surface, and a second guide surface located at a laterally opposite side of the drive surface from the first guide surface;

a second race including notches and cam surfaces; and rockers, each rocker located in one of the pockets and including an engagement surface, a convex reaction surface contacting the drive surface only when the engagement surface engages one of the notches, and first and second lateral surfaces which contact the first and second guide surfaces, respectively, when the engagement surface disengages the notch.

15. The clutch of claim 14 wherein:

the rocker further comprises a ratchet surface;

the second lateral surface is a planar surface;

the second guide surface is a planar surface that contacts the planar second lateral surface when the clutch overruns.

16. The clutch of claim 14 wherein:

the reaction surface is forced into seated contact on the drive surface when the engagement surface engages one of the notches and the clutch is engaged.

17. The clutch of claim 14 wherein:

the drive surface is formed in a first corner of the pocket;

the reaction surface is forced into seated contact on the drive surface;

the pocket further comprises a concave corner surface formed in a second corner of the pocket, spaced from the first corner;

the rocker further comprises a convex corner surface substantially complementary to the concave corner surface, and a concave surface extending between the convex corner surface and the reaction surface.

18. The clutch of claim 14 wherein the rocker further comprises a ratchet surface for contacting and sliding over the cam surfaces when the clutch overruns.

19. The clutch of claim 14 further comprising springs located on the first race, each spring urging one of the rockers toward engagement with the cam surfaces.

* * * * *